Figure 1:
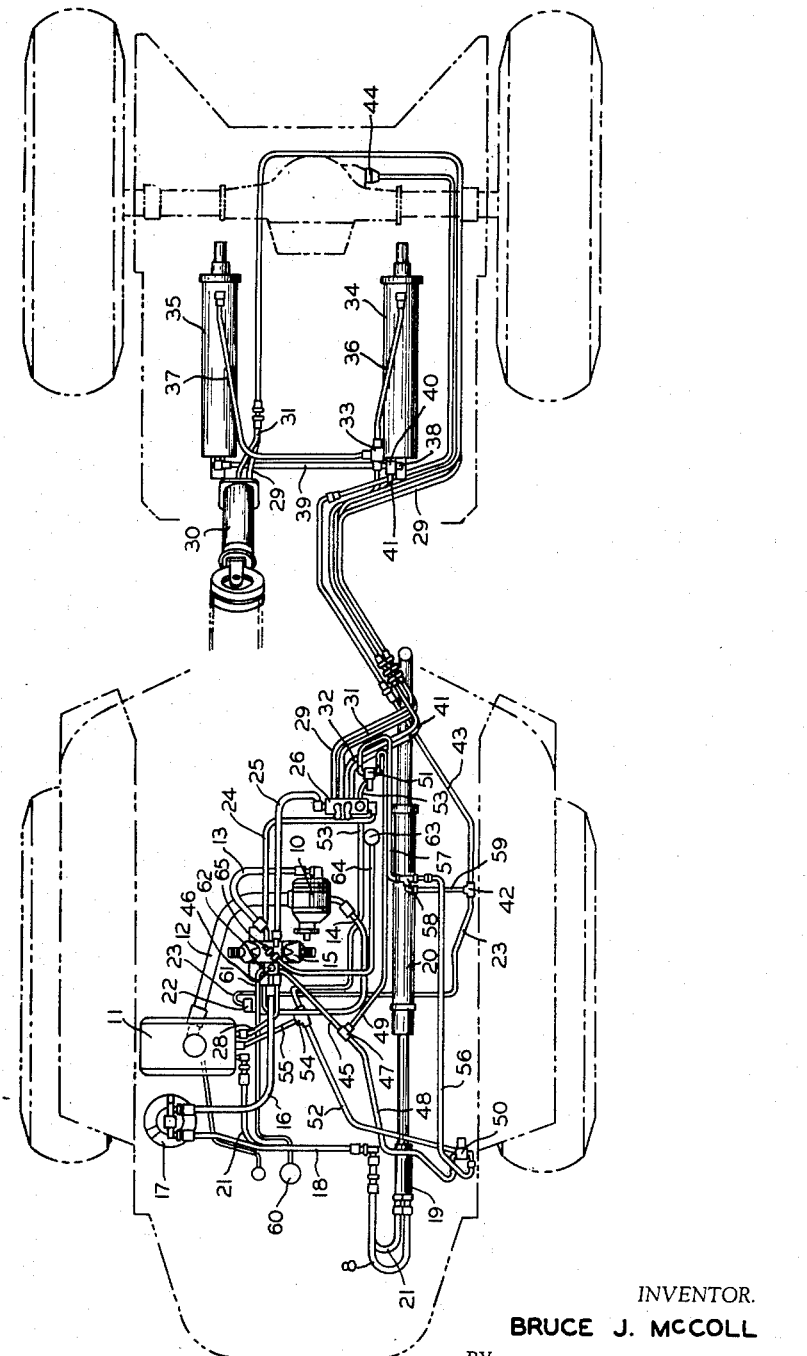

May 17, 1960 B. J. McCOLL 2,936,587
HYDRAULIC SYSTEM FOR VEHICLE
Filed March 18, 1957 4 Sheets-Sheet 1

INVENTOR.
BRUCE J. McCOLL
BY
ATTY.

May 17, 1960　　　　B. J. McCOLL　　　　2,936,587
HYDRAULIC SYSTEM FOR VEHICLE

Filed March 18, 1957　　　　　　　　　　　　4 Sheets-Sheet 2

INVENTOR.
BRUCE J. McCOLL
BY
　　*J. Frederick Bechtel*
　　　　ATTY.

May 17, 1960  B. J. McCOLL  2,936,587
HYDRAULIC SYSTEM FOR VEHICLE
Filed March 18, 1957  4 Sheets-Sheet 3

INVENTOR.
BRUCE J. McCOLL
BY
J. Frederick Bechtel
ATTY.

May 17, 1960  B. J. McCOLL  2,936,587
HYDRAULIC SYSTEM FOR VEHICLE
Filed March 18, 1957  4 Sheets-Sheet 4
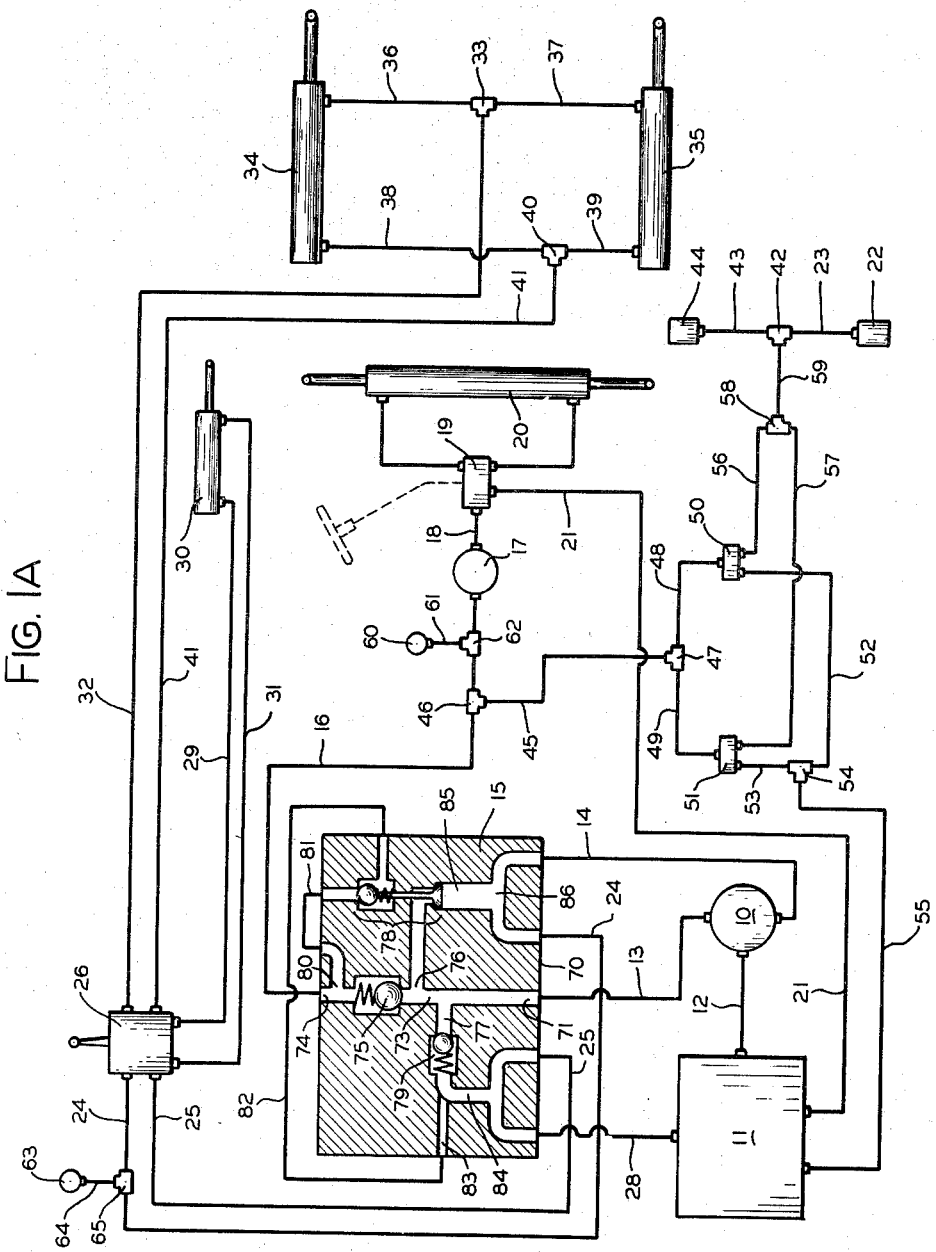
INVENTOR.
BRUCE J. McCOLL
BY Kenneth C. Witt
ATTY.

United States Patent Office 2,936,587
Patented May 17, 1960

2,936,587

HYDRAULIC SYSTEM FOR VEHICLE

Bruce J. McColl, Strathmore, Quebec, Canada, assignor to Clark Equipment Company, a corporation of Michigan Application March 18, 1957, Serial No. 646,697

Claims priority, application Canada April 3, 1956

5 Claims. (Cl. 60—51)

This invention relates to the hydraulic system of a vehicle.

The object of this invention is to provide an improved hydraulic system for a vehicle of the type described in my United States Patent 2,720,988, dated October 18, 1955 and my copending application Serial No. 615,869, filed October 15, 1956, now Patent 2,884,083, dated April 28, 1959, and which requires hydraulic fluid both for the steering of the vehicle and also for other operations such as loading articles onto the vehicle.

A further object is to provide a hydraulic system for the purposes described above in which hydraulic fluid is automatically diverted from the steering circuit when not required for steering purposes to augment the hydraulic fluid used for the loading operation while at the same time keeping hydraulic fluid immediately available for the steering system whenever required.

The manner in which the foregoing is accomplished in accordance with this invention will be apparent from the description and drawings illustrating the preferred embodiment of this invention. The scope of this invention will appear from the appended claims.

Figure 2:
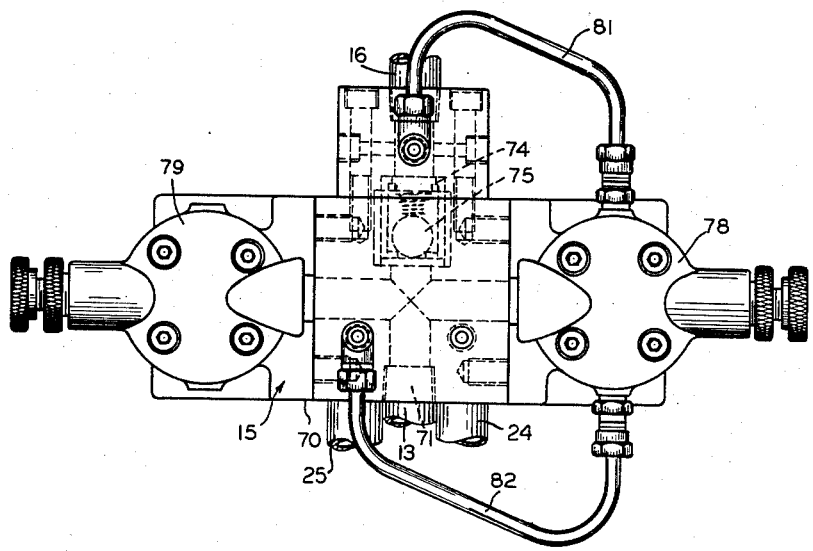
Figure 3:
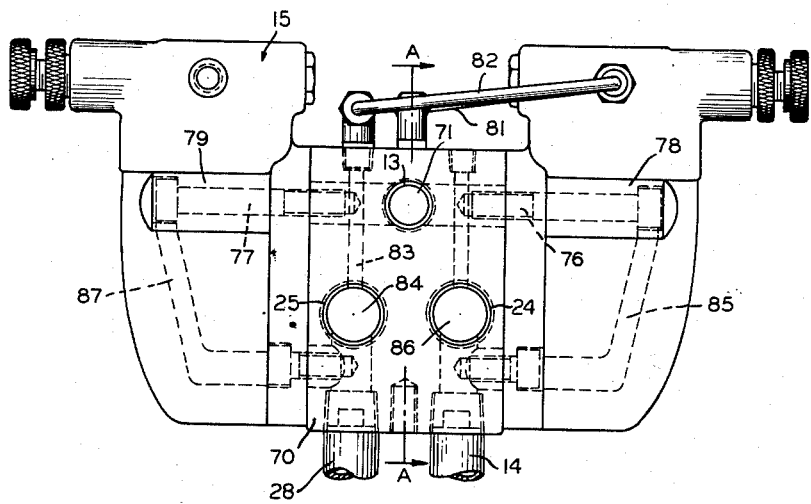
Figure 4:
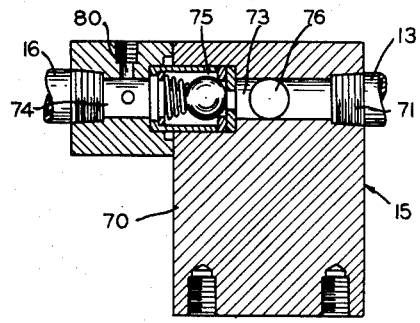
Figure 5:
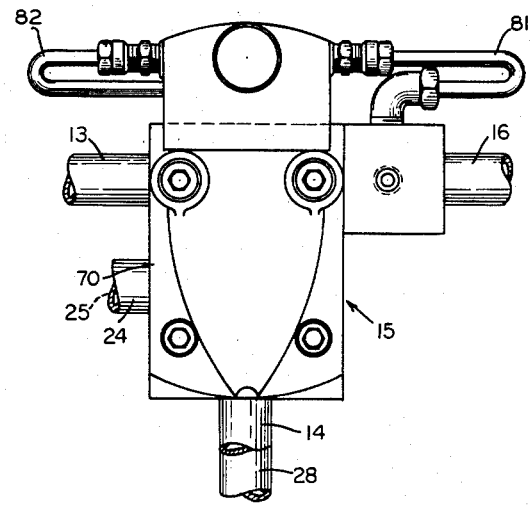

In the drawings which illustrate the preferred embodiment of this invention:

Figure 1 is a detailed view of a hydraulic circuit as assembled on a vehicle in accordance with this invention, Figure 1A is a simplified schematic diagram of the hydraulic circuit of Figure 1, Figure 2 is a plan view of an unloading valve used in the hydraulic circuit of Figures 1 and 1A, Figure 3 is an elevation view of the unloader valve of Figure 2, Figure 4 is a section view on the line A—A of Figure 3, and Figure 5 is an end elevation view of the unloader valve shown in Figures 2 and 3.

Referring now to Figures 1 and 1A of the drawings, dual pump 10 is suitably driven by a motor (not shown) and withdraws hydraulic fluid from reservoir 11 through suction line 12. Part of the hydraulic fluid is directed by pump 10 to steering pressure line 13 and part to loading system pressure line 14. Pressure lines 13 and 14 are both directed to an unloader valve 15 which will be described in detail in relation to Figures 2 to 5 inclusive and which acts to divert hydraulic fluid from the steering pressure system to the loading pressure system when the hydraulic fluid is not required for steering purposes.

The hydraulic fluid for steering purposes after passing through unloader valve 15, which includes a check valve, is directed by steering system pressure line 16 to accumulator 17 and from thence through pressure line 18 to a valve 19 controlling double acting steering cylinder 20. Steering valve 19 is controlled by a linkage from the steering wheel (indicated schematically in Figure 1A) so as to actuate double acting steering cylinder 20 to change direction either to the left or to the right. Steering system return line 21 is provided for returning hydraulic fluid from the steering system to reservoir 11.

Loading system pressure line 14 passes through unloader valve 15. Loading system pressure line 24 then conducts the hydraulic fluid to a dual three position four way open center loading system valve 26. Valve 26 is of conventional constructon and may, for example, be of the type shown in Canadian Patent 408,605, dated November 10, 1942, for an invention of L. Raymond Twyman entitled, "Multiple Valve Bank." When it is in neutral position the hydraulic fluid is returned by loading system return line 25 through valve 15 and along return line 28 to reservoir 11. Valve 26 can also be positioned to direct hydraulic fluid along pressure line 29 to actuate sling tightening cylinder 30 in one direction, line 31 being utilized as the return line and the fluid from line 31 being diverted by valve 26 into loading system return line 25. Valve 26 can also be adjusted to direct hydraulic fluid into line 31 as a pressure line utilizing line 29 as a return line to move sling tightening cylinder 30 in an opposite direction. Valve 26 can also be adjusted to direct hydraulic fluid through cradle controlling pressure line 32 which directs hydraulic fluid to a junction 33 where it is diverted to cradle elevating cylinders 34 and 35 respectively by lines 36 and 37 respectively. The return from cradle cylinders 34 and 35 respectively passes by return lines 38 and 39 respectively to junction 40 and from thence through return line 41 to valve 26 which diverts the return to loading system return line 25. Valve 26 can also be adjusted to direct hydraulic fluid under pressure to control the cradle cylinders along line 41 utilizing line 32 as a return line.

The pressure supply line for hydraulic fluid to the differential lock system is directed by line 45 which is connected to steering pressure line 16 at 46, to junction 47 where differential lock circuit pressure lines 48 and 49 respectively direct hydraulic fluid to front differential lock valve 50 and rear differential lock valve 51. Differential lock valves 50 and 51 have return lines 52 and 53 respectively leading to a junction at 54 with a return line 55 to reservoir 11. Differential lock valves 50 and 51 direct hydraulic fluid through lines 56 and 57 respectively to a shuttle valve 58 which directs the hydraulic fluid along line 59 to a junction 42 which supplies the hydraulic fluid through line 43 to a single acting rear differential lock cylinder 44 and through line 23 to a single acting front differential lock cylinder 22.

A pressure gauge 60 is connected by line 61 to a junction at 62 with steering system pressure line 16. A loading system pressure gauge 63 is connected by line 64 to a junction at 65 with loading system pressure line 24.

Referring now to Figures 1A to 5 inclusive of the drawings, the unloader valve 15 comprises a block 70 having a steering system pressure inlet 71 communicating with steering system pressure line 13 and leading via passage 73 to an outlet 74 connected to steering system pressure line 16. A check valve 75 is included in passage 73. Ports 76 and 77 leading to unloader valve 78 and relief valve 79 respectively are disposed in passage 73. Passage 73 also leads to an outlet port 80 leading to a pilot line 81 for the more accurate control of unloader valve 78. Pilot line 81 has a return line 82 communicating through port 83 with a passage 84 which communicates with loading system return lines 25 and 28. At a predetermined pressure such as for example 1200 p.s.i. hydraulic fluid from passage 71 is released by unloader valve 78 so as to be diverted through passage 85 to a passage 86 communicating with loading system lines 14 and 24. Hence, when the vehicle is being steered the pressure drop due to the steering causes unloader valve 78 to be closed and all of the hydraulic fluid supplied to the steering system by pump 10 is used for steering purposes. When, however, no steering is taking place, the hydraulic pressure will build up in the steering system exceeding the predetermined pressure of 1200 p.s.i. and unloader valve 78 will cause the excess hydraulic fluid pressure to be diverted through passage 85 to the pressure line of the loading system to augment the hydraulic fluid available for loading. This means that when steering is not taking place the full resources from pump 10 will be devoted to loading while at the same time retaining the predetermined pressure of 1200 p.s.i. in the steering system so that adequate pressure will immediately be available for steering purposes. Relief valve 79 is provided for diverting hydraulic fluid from passage 71 to passage 84 leading to the return to the tank through passage 87 when hydraulic pressure exceeds a higher predetermined pressure such as for example 1500 p.s.i. If the loading system is not being used and the steering system is at the predetermined pressure the hydraulic fluid from both pressure lines 13 and 14 will return to the reservoir 11 through loading system pressure line 24, valve 26 and loading system return line 25.

Unloader valve 78 is actuated by pilot lines 81 and 82 which are based on the pressure differential between the hydraulic fluid in hydraulic system pressure line 16 and that in return passage 84 instead of on the differential between the fluid in passages 73 and 86 since the pressure differential between passages 73 and 86 might be small but it might still be desirable for the unloader valve to open and also the differential between passages 73 and 86 might be large but the hydraulic fluid in passage 73 might still be required for steering. By using the pilot lines 81 and 82 to control valve 78, the operation of valve 78 is made effective at a substantially definite pressure within pressure line 16 independently of the pressure within passage 86. Check valve 75 performs the important function of preventing hydraulic fluid from accumulator 17 from being unloaded into the loading system upon the actuation of the unloader valve. Additional details of a suitable unloader valve are shown in Canadian Patent 487,311, dated October 14, 1952, for an invention of E. J. Vander Velde, entitled "Power Transmission."

I claim:

1. A hydraulic system for a vehicle utilizing hydraulic pressure for steering and a second purpose comprising a reservoir for hydraulic fluid, means connected by a suction line to said reservoir for generating hydraulic pressure for steering and for said second purpose, separate pressure lines from said pressure generating means for steering and for said second purpose, return lines leading to said reservoir, and an unloader valve for diverting hydraulic fluid from the steering pressure line to the pressure line for said second purpose when and for as long as the hydraulic pressure in said steering pressure line exceeds a predetermined value, said unloader valve comprising means communicating between the steering pressure line and the pressure line for said second purpose, valve means controlling the passage of fluid through said means communicating between the steering pressure line and the pressure line for said second purpose and means controlled by the pressure difference between the pressure in said steering pressure line and the pressure in one of said return lines for opening said valve means when the pressure within the steering pressure line exceeds said predetermined value.

2. A hydraulic system as in claim 1 in which said means for controlling the valve means comprises a pilot line communicating between said steering pressure line and said one of said return lines.

3. A hydraulic system as in claim 1 in which the hydraulic pressure for said second purpose is utilized for loading the vehicle.

4. A hydraulic system as in claim 2 in which said pilot line communicates with a portion of said steering pressure line separated from said unloader valve by check valve means to maintain the steering pressure at said predetermined value when said unloader valve is open.

5. A hydraulic system as in claim 4 in which said portion of said steering pressure line includes accumulator means.

References Cited in the file of this patent

UNITED STATES PATENTS

| | | |
|---|---|---|
| 2,363,179 | Harrington et al. | Nov. 21, 1944 |
| 2,643,516 | Carlson | June 30, 1953 |
| 2,674,092 | Gardiner | Apr. 6, 1954 |
| 2,793,498 | Banker | May 28, 1957 |
| 2,797,551 | Adams et al. | July 2, 1957 |
| 2,799,996 | Van Meter | July 23, 1957 |